(12) United States Patent
Sikri

(10) Patent No.: US 11,698,948 B2
(45) Date of Patent: Jul. 11, 2023

(54) SYSTEMS AND METHODS FOR VALIDATING LICENSES

(71) Applicant: FusionCharts, Inc., Austin, TX (US)

(72) Inventor: Gagan Sikri, Kaithal (Haryana) (IN)

(73) Assignee: FUSIONCHARTS, INC., Austin, TX (US)

( * ) Notice: Subject to any disclaimer, the term of this patent is extended or adjusted under 35 U.S.C. 154(b) by 205 days.

(21) Appl. No.: 17/331,465

(22) Filed: May 26, 2021

(65) Prior Publication Data

US 2022/0019643 A1 Jan. 20, 2022

Related U.S. Application Data

(60) Provisional application No. 63/052,896, filed on Jul. 16, 2020.

(51) Int. Cl.
*G06F 21/10* (2013.01)
*G06F 21/31* (2013.01)
*G06F 21/72* (2013.01)
*G06F 21/60* (2013.01)

(52) U.S. Cl.
CPC .......... *G06F 21/105* (2013.01); *G06F 21/31* (2013.01); *G06F 21/602* (2013.01); *G06F 21/72* (2013.01)

(58) Field of Classification Search
CPC ...... G06F 21/105; G06F 21/31; G06F 21/602; G06F 21/72
See application file for complete search history.

(56) References Cited

U.S. PATENT DOCUMENTS

| | | | |
|---|---|---|---|
| 6,219,652 B1* | 4/2001 | Carter | G06F 21/10 726/28 |
| 6,920,567 B1* | 7/2005 | Doherty | G06F 21/105 713/168 |
| 2002/0007456 A1* | 1/2002 | Peinado | H04L 63/12 713/164 |
| 2013/0166909 A1* | 6/2013 | Agrawal | G06F 21/64 713/168 |
| 2020/0285716 A1* | 9/2020 | Punathil | G06F 16/243 |
| 2021/0326464 A1* | 10/2021 | Zhu | G06F 21/602 |

* cited by examiner

*Primary Examiner* — Ayoub Alata
(74) *Attorney, Agent, or Firm* — Foley & Lardner LLP

(57) ABSTRACT

A method for license validation is disclosed herein, including receiving one or more strings of one or more parameters defining a license authorizing access to at least one or more portions of software, generating a first hash based on the one or more parameters defining the license and a key, storing parameters defining the generated first hash, storing the generated first hash, responsive to an element rendering on a web page, determining a version of an application program interface used to generate the first hash and the key used to generate the hash, by interpreting the hash, and integrating the one or more portions of software for use by a user. The one or more portions of software are integrated based on the one or more parameters defining the license embedded in the first hash.

20 Claims, 11 Drawing Sheets

1

SYSTEMS AND METHODS FOR VALIDATING LICENSES

CROSS-REFERENCE TO RELATED APPLICATIONS AND CLAIM OF PRIORITY

This application claims the benefit of U.S. Provisional Application No. 63/052,896, filed Jul. 16, 2020, the content of which are fully incorporated herein by reference in its entirety.

BACKGROUND

The present disclosure relates generally to validating licenses. The present disclosure relates more particularly to license validation using distributive systems and crypto application program interfaces.

Licenses can be used to allow users to access code or portions of code. In response to a user's invalid license, a user may be restricted in using code, software, or applications. Some examples of different licenses include machine based licenses, when licenses are associated with physical or virtual machines; user based licenses, when licenses are associated with certain users; subscription licenses, when users pay a fee and have access to the license during the subscription term, or for as long as the user continues to pay the fee; cloud based licenses, when licenses can be granted based on a number of users/processors/cores that the software runs on, and so on.

Although there are many different types of licenses, there are generally three main methods of validating licenses. The first method of license validation utilizes a license key. This method of validation requires the user to possess a license key. A license key can be received for example, via a CD/DVD or by downloading a pre-defined license key. The second method of license validation is online license validation. This method of validation requires users to connect to a network such that an external network can validate the license. The third method of license validation is hardware license validation. This method of validation requires hardware to be installed, allowing the hardware to validate the license.

Accordingly, a method for validating licenses that does not require a pre-defined license key, a connection to an external server, or require a hardware installation can be desired. For example, a validation method that allows developers developing client-side JavaScript applications can be desirable such that the developed applications are available to licensed users only.

The information disclosed in this Background section is for enhancement of understanding of the background of the disclosure, and therefore, it can contain information that does not constitute prior art.

SUMMARY

The example arrangements disclosed herein are directed to solving the issues relating to one or more of the problems presented in conventional licensing schemes, as well as providing additional features that will become readily apparent by reference to the following detailed description when taken in conjunction with the accompanying drawings. In accordance with various arrangement, example methods and computer program products are disclosed herein. It is understood however, that these arrangements are presented by way of example and are not limited, and it will be apparent to hose or ordinary skill in the art who read the present disclosure that various modifications to the disclosed arrangements can be made while remaining within the scope of this disclosure.

In some example arrangements, a method for license validation includes receiving, by a processor on a user device, one or more strings of one or more parameters defining a license authorizing access to at least one or more portions of software, generating, by the processor, a first hash based on the one or more parameters defining the license and a key, storing, by the processor, parameters defining the generated first hash, storing, by the processor, the generated first hash, responsive to an element rendering on a web page, determining, by the processor, a version of an application program interface used to generate the first hash and the key used to generate the hash, by interpreting the hash, and integrating, by the processor, the one or more portions of software for use by a user based on the one or more parameters defining the license embedded in the first hash.

In further examples, the license authorizing access to at least one or more portions of software includes at least one of one or more software functions, one or more software libraries, and one or more software modules.

In further examples, the license validation is implemented via an application program interface on a user device.

In further examples, the application program interface implements a web crypto application program interface.

In further examples, the output of the web crypto application interface is a WordArray object.

In further examples, the parameters defining the license include at least one of: a start license date; an end license date; a license status; a license type; a grace period; a version number; a module signifier; an upgrade number; and a failsafe flag.

In further examples, the parameters defining the generated first hash include at least one of: a date of the first hash generation; and a version number of an application program interface that generated the first hash.

Further examples include generating one or more hashes based on the generated first hash.

Further examples include using a second generated hash to point to the first generated hash, the second hash generated based on a second set of one or more parameters defining a license and a second key, by chaining hashes.

In further examples, interpreting the first hash further includes scanning, triggered by the rendering of the element on the web page; monitoring, by the processor, a document object module; detecting, by the processor, based on the scanned rendered element, the first hash; determining, by the processor, based on the first hash, parameters defining the first hash; selecting, by the processor, based on the parameters defining the first hash, the key; and determining, by the processor, using the key and scanned rendered element from the document object module, parameters defining the license embedded in the first hash.

In further examples, the monitoring is implemented by a MutationObserver application program interface.

Further examples include determining, by the processor, to restrict at least one of one or more local applications and one or more features of one or more applications.

Further examples include determining, by the processor, to overlay a trial mark to the user, the trial mark obscuring at least some portion of the one or more local applications.

In further examples, the license authorizing access to at least one or more portions of software is encrypted during a first time period, wherein license decryption is completed during a second time period, the second time period occurring a time after the first time period.

In further examples, the encryption of the license further includes receiving the one or more strings; generating the first hash; storing the parameters defining the generated first hash; and storing the generated first hash.

In further examples, the decryption further includes scanning, triggered by the rendering of the element on the web page; monitoring, by the processor, a document object module; detecting, by the processor, based on the scanned rendered element, the first hash; determining, by the processor, based on the first hash, parameters defining the first hash; selecting, by the processor, based on the parameters defining the first hash, the key; determining, by the processor, using the key and scanned rendered element from the document object module, parameters defining the license embedded in the first hash; and integrating the one or more portions of software for use by a user.

In further examples, the one or more strings of one or more parameters define a license authorizing access to at least one or more portions of software can be received by a user input.

In further examples, the one or more strings of one or more parameters define a license authorizing access to at least one or more portions of software can be received by a non-user input.

In further examples, the generated first hash is uniquely mapped to the one or more parameters defining the license.

Further examples relate to a computer program product includes a computer-readable program medium code stored thereupon, the code, when executed by a processor, causing the processor to implement a method recited in any of the above examples.

The above and other aspects and their implementations are described in greater detail in the drawings, the descriptions, and the claims.

BRIEF DESCRIPTION OF THE DRAWINGS

Various example arrangements of the present solution are described in detail below with reference to the following figures or drawings. The drawings are provided for purposes of illustration only and merely depict example arrangements of the present solution to facilitate the reader's understanding of the present solution. Therefore, the drawings should not be considered limiting of the breadth, scope, or applicability of the present solution. It should be noted that for clarity and ease of illustration, these drawings are not necessarily drawn to scale.

DETAILED DESCRIPTION OF EXAMPLE ARRANGEMENTS

Figure 1:
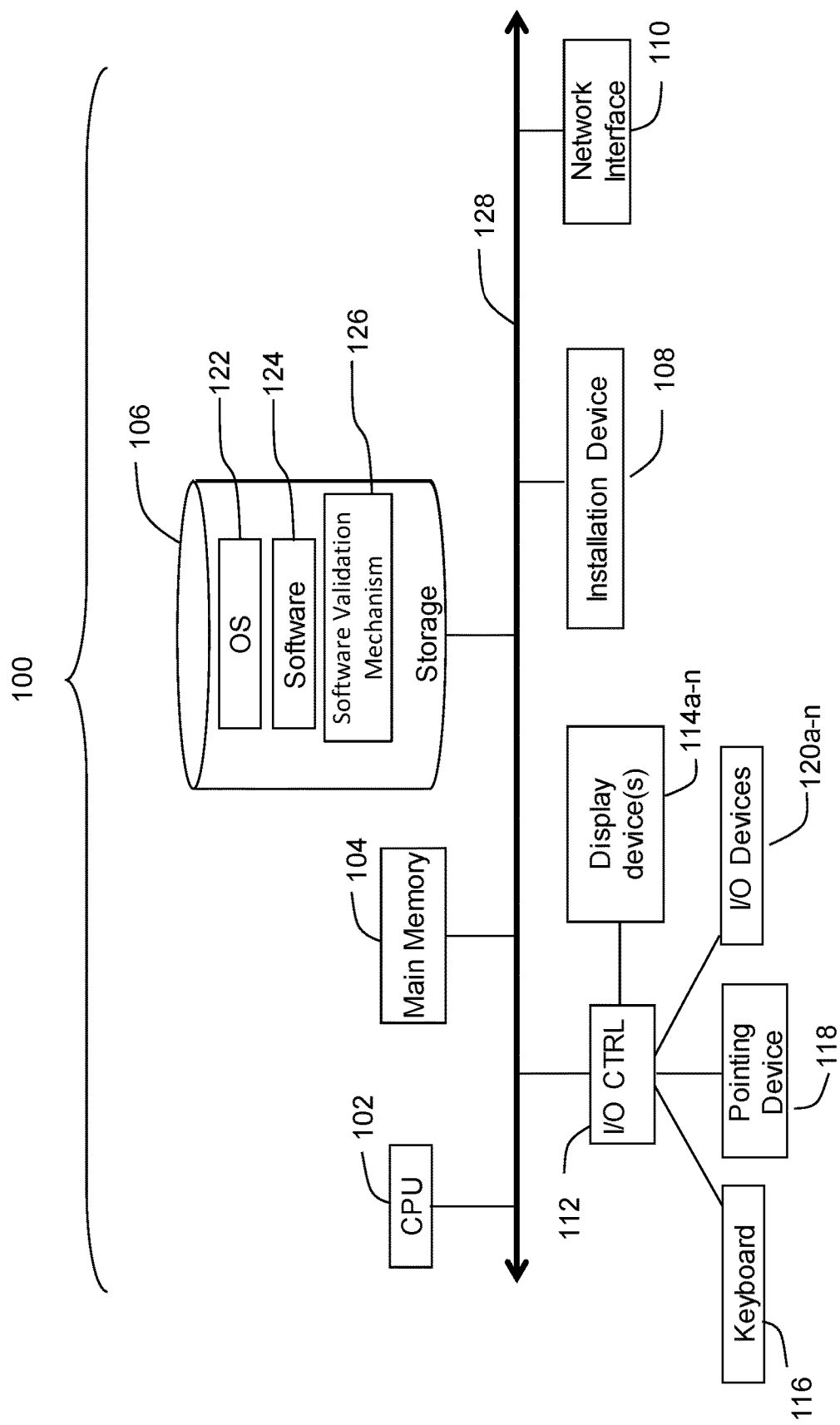
FIG. 1 is a block diagram of a computing device that can protect one or more portions of software using an application program interface via one or more licenses, according to some arrangements.

Hereinafter, example arrangements will be described in more detail with reference to the accompanying drawings, in which like reference numbers refer to like elements throughout. The present disclosure, however, can be embodied in various different forms, and should not be construed as being limited to only the illustrated arrangements herein. Rather, these arrangements are provided as examples so that this disclosure will be thorough and complete, and will fully convey the aspects and features of the present disclosure to those skilled in the art. Accordingly, processes, elements, and techniques that are not necessary to those having ordinary skill in the art for a complete understanding of the aspects and features of the present disclosure may not be described. Unless otherwise noted, like reference numerals denote like elements throughout the attached drawings and the written description.

In some arrangements, a method for license validation includes receiving, by a processor on a user device, one or more strings of one or more parameters defining a license authorizing access to at least one or more portions of software, generating, by the processor, a first hash based on the one or more parameters defining the license and a key, storing, by the processor, parameters defining the generated first hash, storing, by the processor, the generated first hash, responsive to an element rendering on a web page, determining, by the processor, a version of an application program interface used to generate the first hash and the key used to generate the hash, by interpreting the hash, and integrating, by the processor, the one or more portions of software for use by a user. The one or more portions of software are integrated based on the one or more parameters defining the license embedded in the first hash. Further, the license authorizing access to at least one or more portions of software includes at least one of one or more software functions, one or more software libraries, and one or more software modules. Further, the license validation is implemented via an application program interface on a user device. In addition, the application program interface implements a web crypto application program interface. The web crypto application programming interface outputs an object such as a WordArray, or array.

In some arrangements, the parameters defining the license include at least one of: a start license date, an end license date, a license status, a license type, a grace period, a version number, a module signifier; an upgrade number, and a failsafe flag. The parameters defining the generated first hash include at least one of: a date of the first hash generation and a version number of an application program interface that generated the first hash. Further, one or more hashes are generated based on the generated first hash. Further, chaining hashes includes using the first generated hash to point to a second hash, the second hash generated based on a second set of one or more parameters defining a license and a key.

In some arrangements, interpreting the first hash further includes scanning, triggered by the rendering of the element on the web page, monitoring a document object module, detecting a first hash based on the scanned rendered element, determining parameters defining the first hash based on the first hash, selecting a key based on the parameters defining the first hash, and determining parameters defining the licensed embedded in the first hash using the key and scanned rendered element from the document object module. In addition, the monitoring is implemented by a MutationObserver application program interface.

In some arrangements, the processor may determine to restrict at least one of one or more local applications and one or more features of one or more applications. Further, the processor may determine to overlay a trial mark to the user, the trial mark obscuring at least some portion of the one or more local applications.

In some arrangements, there may be a first time period and a second time period. The license authorizing access to at least one or more portions of software is encrypted during the first time period. The license decryption is completed during the second time period, the second time period occurring a time after the first time period. In addition, the encryption of the license further includes: receiving the one or more strings, generating the first hash, storing the parameters defining the generated first hash, and storing the generated first hash. In addition, the license decryption includes scanning, triggered by the rendering of the element on the web page, monitoring a document object module, detecting the first hash based on the scanned rendered element, determining parameters defining the first hash based on the first hash, selecting the key based on the parameters defining the first hash, determining parameters defining the licensed embedded in the first hash using the key and scanned rendered element from the document object module, and integrating one or more portions of software for use by a user. Further, the one or more strings of one or more parameters defining a license authorizing access to at least one or more portions of software can be received by a user input. In addition, the one or more strings of one or more parameters defining a license authorizing access to at least one or more portions of software can be received by a non-user input. In addition, the generated first hash is uniquely mapped to the one or more parameters defining the license.

Referring now to FIG. 1, a block diagram of a computing device that can protect one or more portions of software using an application program interface via one or more licenses is shown, according to some arrangements. The computing device 100 can be useful for practicing one or more arrangements of the present disclosure. As shown in FIG. 1, in some arrangements, the computing device 100 includes a central processing unit 102, a main memory unit 104, a storage device 106, an installation device 108, a network interface 110, an input/output (I/O) controller 112, one or more display devices 114 (e.g., 114*a*-114*n*), a keyboard 116, and a pointing device 118 (e.g., a mouse). The storage device 106 can include, without limitation, an operating system (OS) 122, software 124 implemented via the OS 122, and a software validation mechanism (or tool) 126. The software validation mechanism 126 can be one of the different types of software 124 implemented by the OS. The computing device 100 can also include additional optional elements, for example, such as a memory port, a bridge, one or more input/output devices 120 (e.g., 120*a*-120*n*), and cache memory in communication with the central processing unit 102.

In some arrangements, the central processing unit 102 can be any suitable logic circuitry that responds to and processes instructions fetched from the main memory unit 104. In some arrangements, the central processing unit 102 is provided by a microprocessor unit. For example, in some arrangements, the microprocessor unit can include one or more microprocessors manufactured by Intel Corporation of Mountain View, Calif., Motorola Corporation of Schaumburg, Ill., the ARM processor and TEGRA system on a chip (SoC) manufactured by Nvidia of Santa Clara, Calif., the POWER7 processor, those manufactured by International Business Machines of White Plains, N.Y., and/or by Advanced Micro Devices of Sunnyvale, Calif. The computing device 100 can be based on any of these processors, or any other suitable processor capable of operating as described herein. In various arrangements, the central processing unit 102 can utilize instruction level parallelism, thread level parallelism, different levels of cache, and/or multi-core processors. A multi-core processor can include two or more processing units on a single computing component. Examples of a multi-core processors include the AMD PHENOM IIX2, INTEL CORE i5 and INTEL CORE i7.

In some arrangements, the main memory unit 104 can include one or more memory chips capable of storing data and allowing any storage location to be directly accessed by the central processing unit 102. In some arrangements, the main memory unit 104 can be volatile and faster than the storage device 106. In various arrangements, the main memory unit 104 can be Dynamic random access memory (DRAM) or any variants, including static random access memory (SRAM), Burst SRAM or SynchBurst SRAM (BSRAM), Fast Page Mode DRAM (FPM DRAM), Enhanced DRAM (EDRAM), Extended Data Output RAM (EDO RAM), Extended Data Output DRAM (EDO DRAM), Burst Extended Data Output DRAM (BEDO DRAM), Single Data Rate Synchronous DRAM (SDR SDRAM), Double Data Rate SDRAM (DDR SDRAM), Direct Rambus DRAM (DRDRAM), and/or Extreme Data Rate DRAM (XDR DRAM). In some arrangements, the main memory 104 or the storage device 106 can be non-volatile memory, for example, such as non-volatile read access memory (NVRAM), flash memory non-volatile static RAM (nvSRAM), Ferroelectric RAM (FeRAM), Magnetoresistive RAM (MRAM), Phase-change memory (PRAM), conductive-bridging RAM (CBRAM), Silicon-Oxide-Nitride-Oxide-Silicon (SONOS), Resistive RAM (RRAM), Racetrack, Nano-RAM (NRAM), and/or Millipede memory. The main memory 104 can be based on any of the above described memory chips, or any other available memory chips capable of operating as described herein. In some arrangements, the central processing unit 102 communicates with the main memory unit 104 via a system bus 128 (described in more detail herein). In other arrangements, the central processing unit 102 can communicate directly with the main memory unit 104 via a memory port.

In some arrangements, the central processing unit 102 can communicate directly with cache memory via a secondary bus, sometimes referred to as a backside bus. In other arrangements, the central processing unit 102 can communicate with cache memory using the system bus 128. Cache memory typically has a faster response time than the main memory unit 104, and is typically provided by SRAM, BSRAM, or EDRAM. In some arrangements, the central processing unit 102 communicates with various I/O devices 120 via a local system bus (e.g., the system bus 128). Various buses can be used to connect the central processing unit 102 to any of the I/O devices 120, including a PCI bus, a PCI-X bus, or a PCI-Express bus, or a NuBus. In arrangements in which the I/O devices 120 include a video display device 114, the central processing unit 102 can use an Advanced Graphics Port (AGP) to communicate with the display device 114 or the I/O controller 112 for the display device 114.

In various arrangements, a wide variety of I/O devices 120a-120n can be included in the computing device 100. For example, in various arrangements, the input devices of the I/O devices 120a-n can include keyboards, mice, trackpads, trackballs, touchpads, touch mice, multi-touch touchpads and touch mice, microphones, multi-array microphones, drawing tablets, cameras, single-lens reflex camera (SLR), digital SLR (DSLR), CMOS sensors, accelerometers, infrared optical sensors, pressure sensors, magnetometer sensors, angular rate sensors, depth sensors, proximity sensors, ambient light sensors, gyroscopic sensors, and/or other sensors. In various arrangements, the output devices of the I/O devices 120a-n can include, for example, video displays, graphical displays, speakers, headphones, inkjet printers, laser printers, and/or 3D printers.

In some arrangements, I/O devices 120a-120n can include a combination of multiple input or output devices, such as, for example, Microsoft KINECT, Nintendo Wiimote for the WII, Nintendo WII U GAMEPAD, Apple IPHONE, Android based smart phones, and/or the like. In some arrangements, some of the I/O devices 120a-120n can allow gesture recognition inputs through a combination of some of the inputs and outputs. In some arrangements, some of the I/O devices 120a-120n can provide for facial recognition, which can be utilized as an input for different purposes including authentication and other commands. In some arrangements, some of the I/O devices 120a-120n can provide for voice recognition and inputs, such as, for example, Microsoft KINECT, SIRI for IPHONE by Apple, Google Now or Google Voice Search, and/or the like.

In some arrangements, addition I/O devices 120a-120n can have both input and output capabilities, including, for example, haptic feedback devices, touchscreen displays, multi-touch displays, and/or the like. Touchscreen, multi-touch displays, touchpads, touch mice, or other touch sensing devices can use different technologies to sense touch, including, for example, capacitive, surface capacitive, projected capacitive touch (PCT), in-cell capacitive, resistive, infrared, waveguide, dispersive signal touch (DST), in-cell optical, surface acoustic wave (SAW), bending wave touch (BWT), force-based sensing technologies, and/or the like. Some multi-touch devices can allow two or more contact points with the surface, allowing advanced functionality including, for example, pinch, spread, rotate, scroll, and/or other gestures. Some touchscreen devices, including, for example, Microsoft PIXELSENSE and Multi-Touch Collaboration Wall, can have larger surfaces, such as on a table-top or on a wall, and can also interact with other electronic devices. In some arrangements, some of the I/O devices 120a-120n, display devices 114a-114n, or group of devices can be augment reality devices. In some arrangements, the I/O devices (e.g., keyboard 116, pointing device 118, display devices 114, and/or I/O devices 120) can be controlled by the I/O controller 112. In some arrangements, an I/O device can also provide storage and/or an installation medium (e.g., installation device 108) for the computing device 100. In still other arrangements, the computing device 100 can provide USB connections to receive handheld USB storage devices. In further arrangements, an I/O device 120 can be a bridge between the system bus 128 and an external communication bus, for example, such as a USB bus, a SCSI bus, a FireWire bus, an Ethernet bus, a Gigabit Ethernet bus, a Fibre Channel bus, a Thunderbolt bus, and/or the like.

In some arrangements, the display devices 114a-114n can be connected to the I/O controller 112. In various arrangements, the display devices 114a-114n can include, for example, a liquid crystal display (LCD), a thin film transistor LCD (TFT-LCD), a blue phase LCD, an electronic papers (e-ink) display, a flexible display, a light emitting diode display (LED), a digital light processing (DLP) display, a liquid crystal on silicon (LCOS) display, an organic light-emitting diode (OLED) display, an active-matrix organic light-emitting diode (AMOLED) display, a liquid crystal laser display, a time-multiplexed optical shutter (TMOS) display, a 3D or stereoscopic display, and/or the like. Examples of 3D displays can include, for example, stereoscopy, polarization filters, active shutters, autostereoscopy, and/or the like. Display devices 114a-114n can also include a head-mounted display (HMD). In some arrangements, display devices 114a-114n or the corresponding I/O controllers 112 can be controlled through or have hardware support for OPENGL, DIRECTX API, and/or other graphics libraries.

In some arrangements, the computing device 100 can include or connect to multiple display devices 114a-114n, which each can be of the same or different type and/or form. As such, any of the I/O devices 120a-120n and/or the I/O controller 112 can include any type and/or form of suitable hardware, software, or combination of hardware and software to support, enable or provide for the connection and use of multiple display devices 114a-114n by the computing device 100. For example, the computing device 100 can include any type and/or form of video adapter, video card, driver, and/or library to interface, communicate, connect or otherwise use the display devices 114a-114n. In one arrangement, a video adapter can include multiple connectors to interface to multiple display devices 114a-114n. In other arrangements, the computing device 100 can include multiple video adapters, with each video adapter connected to one or more of the display devices 114a-114n. In some arrangements, any portion of the operating system 122 of the computing device 100 can be configured for using multiple displays 114a-114n. In other arrangements, one or more of the display devices 114a-114n can be provided by one or more other computing devices connected to the computing device 100, via a network. In some arrangements software can be designed and constructed to use another computer's display device as a second display device 114a for the computing device 100. For example, in one arrangement, an Apple iPad can connect to a computing device 100 and use the display of the computing device 100 as an additional display screen that can be used as an extended desktop. One of ordinarily skill in the art will recognize and appreciate the various ways and arrangements that a computing device 100 can be configured to have multiple display devices 114a-114n.

In some arrangements, the storage device 106 (e.g. one or more hard disk drives or redundant arrays of independent disks) can store the operating system 122, and/or other related software, and can store application software programs 124 such as any program related to the software instance of the software validation mechanism 126. Examples of the storage device 106 can include hard disk drive (HDD), optical drive including CD drive, DVD drive, and/or BLU-RAY drive, solid-state drive (SSD), USB flash drive, and/or any other suitable device for storing data. Some storage devices 106 can include multiple volatile and non-volatile memories, such as, for example, solid state hybrid drives that combine hard disks with solid state cache. Some storage devices 106 can include non-volatile, mutable, and/or read-only. Some storage devices 106 can be internal and can connect to the computing device 100 via the bus 128. Some storage devices 106 can be external and can be connect to the computing device 100 via an I/O device 120 that provides an external bus. Some storage devices 106 can connect to the computing device 100 via the network interface 110 over a network, such as, for example, the Remote Disk for MACBOOK AIR by Apple. Some computing devices 100 may not require a non-volatile storage device 106 and can be thin clients or zero clients. Some storage devices 106 can also be used as an installation device 108, and can be suitable for installing software and programs. Additionally, the operating system and the software can be run from a bootable medium, for example, such as a bootable CD (e.g. KNOPPIX), which can be a bootable CD for GNU/Linux that is available as a GNU/Linux distribution from knoppix.net.

In some arrangements, the computing device 100 can also install software or application from an application distribution platform. Examples of application distribution platforms include the App Store for iOS provided by Apple, Inc., the Mac App Store provided by Apple, Inc., GOOGLE PLAY for Android OS provided by Google Inc., Chrome Webstore for CHROME OS provided by Google Inc., and Amazon Appstore for Android OS and KINDLE FIRE provided by Amazon.com, Inc. An application distribution platform can facilitate installation of software on the computing device 100. An application distribution platform can include a repository of applications on a server or a cloud, which the computing device 100 can access over a network (e.g., the Internet). An application distribution platform can include application developed and provided by various developers. A user of the computing device 100 can select, purchase, and/or download an application via the application distribution platform.

In some arrangements, the computing device 100 can include the network interface 110 to interface to a network through a variety of connections including, but not limited to, for example, standard telephone lines LAN or WAN links (e.g., 802.11, T1, T3, Gigabit Ethernet, Infiniband), broadband connections (e.g., ISDN, Frame Relay, ATM, Gigabit Ethernet, Ethernet-over-SONET, ADSL, VDSL, BPON, GPON, fiber optical including FiOS), wireless connections, and/or some combination of any or all of the above. Connections can be established using a variety of communication protocols (e.g., TCP/IP, Ethernet, ARCNET, SONET, SDH, Fiber Distributed Data Interface (FDDI), IEEE 802.11/b/g/n/ac CDMA, GSM, WiMax and direct asynchronous connections). In one arrangement, the computing device 100 communicates with other computing devices via any type and/or form of gateway or tunneling protocol (e.g. Secure Socket Layer (SSL) or Transport Layer Security (TLS), or the Citrix Gateway Protocol manufactured by Citrix Systems, Inc. of Ft. Lauderdale, Fla.). In some arrangements, the network interface 110 can include, for example, a built-in network adapter, network interface card, PCMCIA network card, EXPRESSCARD network card, card bus network adapter, wireless network adapter, USB network adapter, modem, and/or any other suitable device for interfacing the computing device 100 to any type of network capable of communication and performing the operations described herein.

In some arrangements, the computing device 100 can operate under the control of the operating system 122, which controls scheduling of tasks and access to system resources. In various arrangements, the computing device 100 can run any suitable operating system 122, such as, for example, any of the versions of the MICROSOFT WINDOWS operating systems, the different releases of the Unix and Linux operating systems, any version of the MAC OS for Macintosh computers, any embedded operating system, any real-time operating system, any open source operating system, any proprietary operating system, any operating systems for mobile computing devices, and/or any other suitable operating system capable of running on the computing device 100 and performing the operations described herein. Some examples of operating systems 122 include, but are not limited to: WINDOWS 2000, WINDOWS Server 2012, WINDOWS CE, WINDOWS Phone, WINDOWS XP, WINDOWS VISTA, WINDOWS 7, WINDOWS RT, WINDOWS 8, WINDOWS 10, and/or the like, all of which are manufactured by Microsoft Corporation of Redmond, Wash.; MAC OS and iOS, manufactured by Apple, Inc. of Cupertino, Calif.; Linux, a freely-available operating system, e.g. Linux Mint distribution ("distro") or Ubuntu, distributed by Canonical Ltd. of London, United Kingdom; Unix or other Unix-like derivative operating systems; and Android, designed by Google, of Mountain View, Calif., but can include others. Some operating systems 122, including, for example, the CHROME OS by Google, can be used on zero clients or thin clients (e.g., CHROMEBOOKS).

In various arrangements, the computing device 100 can be any workstation, telephone, desktop computer, laptop or notebook computer, netbook, ULTRABOOK, tablet, server, handheld computer, mobile telephone, smartphone or other portable telecommunications device, media playing device, a gaming system, mobile computing device, and/or any other suitable type and/or form of computing, telecommunications, or media device that is capable of communication. The computing device 100 has sufficient processor power and memory capacity to perform the operations described herein. In some arrangements, the computing device 100 can have different processors, operating systems, and input devices consistent with the device.

In some arrangements, the computing device 100 can be a gaming system. For example, the computing device 100 can include a PLAYSTATION (1, 2, 3, 4, and/or the like), a PERSONAL PLAYSTATION PORTABLE (PSP), and/or a PLAYSTATION VITA device manufactured by the Sony Corporation of Tokyo, Japan, a NINTENDO DS, NINTENDO 3DS, NINTENDO WII, NINTENDO WII U, and/ or Nintendo Switch device manufactured by Nintendo Co., Ltd., of Kyoto, Japan, an XBOX 360, XBOX one, and/or the like manufactured by the Microsoft Corporation of Redmond, Wash., and/or the like.

In some arrangements, the computing device 100 can be a digital audio player such as the Apple IPOD, IPOD Touch, and IPOD NANO lines of devices, manufactured by Apple Computer of Cupertino, Calif. Some digital audio players can have other functionality, including, for example, a gaming system or any functionality made available by an application from a digital application distribution platform. For example, the IPOD Touch can access the Apple App Store. In some arrangements, the computing device 100 is a portable media player or digital audio player supporting file formats including, but not limited to, MP3, WAV, M4A/ AAC, WMA Protected AAC, AIFF, Audible audiobook, Apple Lossless audio file formats and .mov, .m4v, and/or .mp4 MPEG-4 (H.264/MPEG-4 AVC) video file formats.

In some arrangements, the computing device 100 can be a tablet, for example, such as the IPAD line of devices by Apple; GALAXY TAB family of devices by Samsung; KINDLE FIRE, by Amazon.com, Inc. of Seattle, Wash.; and/or the like. In other arrangements, the computing device 100 can be an eBook reader, such as, for example, the KINDLE family of devices by Amazon.com, or the NOOK family of devices by Barnes & Noble, Inc. of New York City, N.Y.

While some non-limiting examples of various computing devices 100 and components thereof have been described herein, the present disclosure is not limited to. For example, other suitable computing devices and/or components thereof relating to one or more of the various aspects of the operating environments and components described above in the context of the systems and methods disclosed herein are contemplated, as will be apparent to those having ordinary skill in the art.

The present solution for license validation can utilize a two-tier system. In the first tier, the system can determine a scope of a license using parameters that define the license and encrypt one or more portions of code protected by the license. The code protected by the license, for example, can be software 124. The first tier of the system can be considered an encryption utility. In some arrangements, the first tier of the license validation method can occur at a first time. For example, in response to a user's purchase of a license, the encryption utility can begin.

In the second tier, the hash can be decrypted to determine the license parameters. An interpreter, or decryption utility can analyze the hash and decrypt the parameters that define the license. The parameters that define the license, which were determined in the first tier, can be used to determine the code that the user has access to. The second tier of the system can be considered the decryption utility. In some arrangements, the second tier of the license validation method can occur during a second time period after the first time period. For example, the license reader can begin in response to a user seeking to use an application protected under the license. The software used to validate the license, or the code that instructs a processor how to perform tier one and tier two of the present solution, can be software 126.

Different from conventional licensing schemes, the present method of license validation does not need information regarding how various developers design their licenses. Further, the present methods of license validation do not need internet connectivity, any hardware, or user information. Instead, the present methods of license validation can be implemented using an application program interface ("API"). The method, implemented via an API, can allow the generated hash to be checked without dependencies or interference of other applications.

Figure 2:
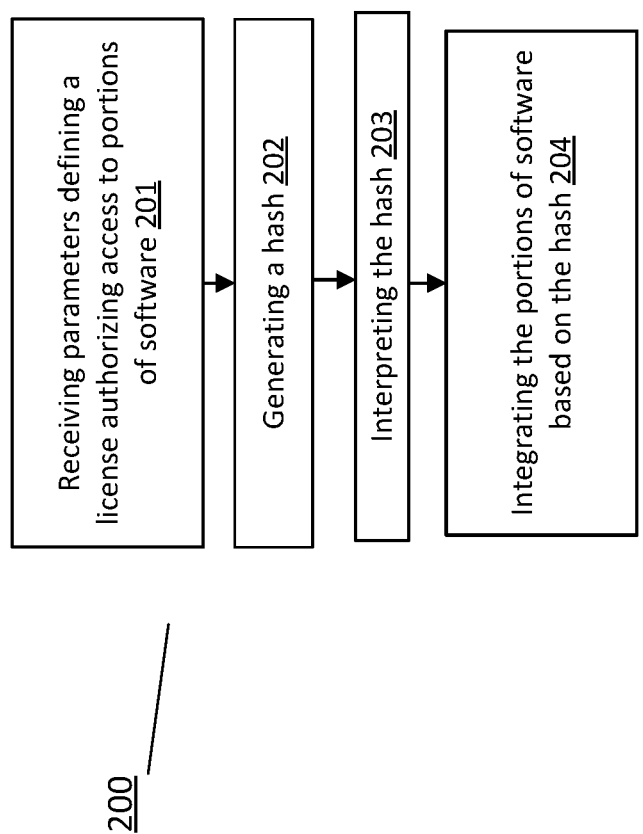
FIG. 2 is a flow chart of a method of license validation, according to some arrangements.

FIG. 2 is a flow chart of a method 200 of license validation, according to some arrangements.

Figure 4:
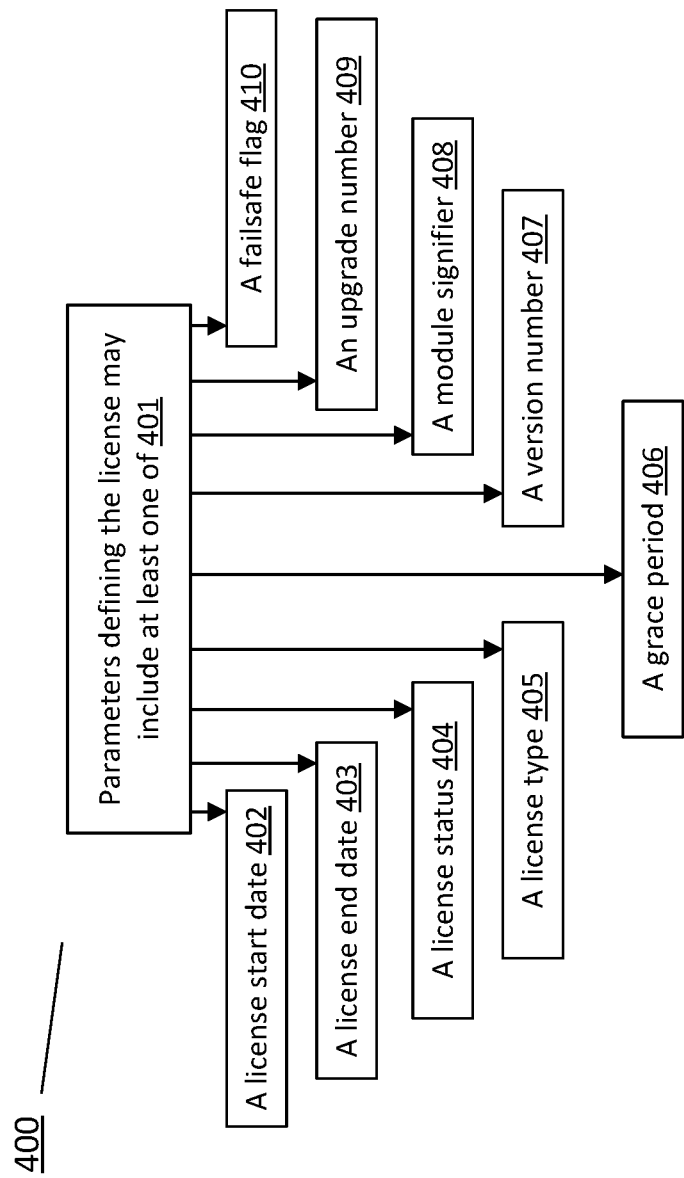
FIG. 4 is a diagram of parameters defining a license, according to some arrangements.

As shown in block 201, a processor on a user device can receive parameters defining a license. Referring to FIG. 4, examples of the parameters 401 defining the license can include one or more of: a license start date 402, a license end date 403, a license status 404, a license type 405, a grace period 406, a version number 407, a module signifier 408, an upgrade number 409, a failsafe flag 410, and so on. The parameters defining the license are not limited to the example parameters illustrated in FIG. 4.

Figure 5:
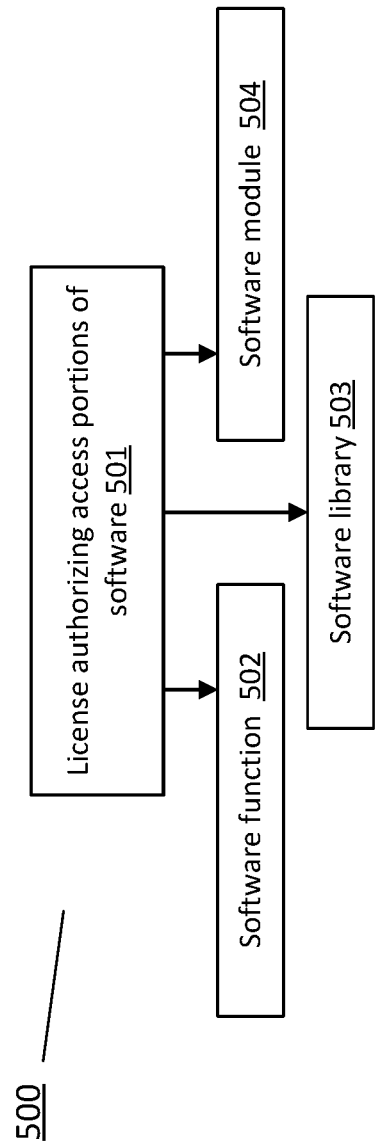
FIG. 5 is a diagram of portions of software that can be protected by a license, according to some arrangements.

In some examples, the software 124 can include multiple different and discrete portions, such that a user can be granted access to one or more or all of these portions via software licensing schemes. In particular, a license can be implemented to authorize access to each of the one or more portions of the software 124. Referring to FIG. 5, a separate license can be used to authorize access to each of multiple portions of software 501. An example of the software 124 is the software 501. An example of a portion of the software 501 includes but is not limited to, a software function 502, a software library 503, a software module 504, and so on. In some examples, the software 501 can include multiple software functions 502, each of which is authorized by a license. In some examples, the software 501 can include multiple software libraries 503, each of which is authorized by a license. In some examples, the software 501 can include multiple software modules 504, each of which is authorized by a license. Accordingly, authorizing usage of software using a license as referred to herein can be likewise applicable to authorizing usage of a portion of the software using a license.

The license validation method can instruct a processor on a user device via an API. The API can receive the parameters defining the scope of the license. As discussed herein, this can be considered tier one of the method. Utilizing an API has a property of reducing the friction between the license validation method and other existing programs on a user device. For example, using a processor according to the arrangements described herein for license validation may not interfere with the processor processing other applications on the user device. Using an API on the user device, compared to using an external validation method, can allow faster validation times.

In addition, utilizing an API can minimize the friction between other applications on the user device and the present solution license validation method. In some arrangements, in response to a malfunctioning license validation method, the users may not be restricted from using the license-protected applications. Thus, the malfunctioning license validation method may not interrupt the user's workflow. In alternate arrangements, in response to a malfunctioning license validation method, a trial mark can be displayed to a user. In alternate arrangements, the license validation method can be defined such that users will be restricted from using certain portions of software in response to a malfunctioning license validation method.

As shown in block 202, a hash can be generated. Examples of hash generation methods are described herein.

As shown in block 203 the hash can be interpreted. The hash can be interpreted, for example, when a user intends to access the software that is protected by the license. In some arrangements, a user can intend to access the software that is protected by the license in response to receiving user input corresponding to loading or accessing a webpage via the keyboard 116. Interpreting the hash can be illustrated in FIG. 6 discussed herein. In brief overview, FIG. 6 describes scanning a webpage for a rendering element to trigger the license validation procedure as shown in block 601, monitoring the document object module as shown in block 602, detecting the hash associated with a rendering element as shown in block 603, determining the hash parameters as shown in block 604, selecting a key based on the hash parameters as shown in block 605, and determining parameters defining the license using the key as shown in block 606.

As shown in block 204, portions of software can be integrated. As depicted in FIG. 5, the one or more portions of software that a user, or a user device, can use include software functions 502, software libraries 503, and software modules 504. In other words, the one or more portions of the software can be integrated into local applications in response to a validated license.

Figure 3:
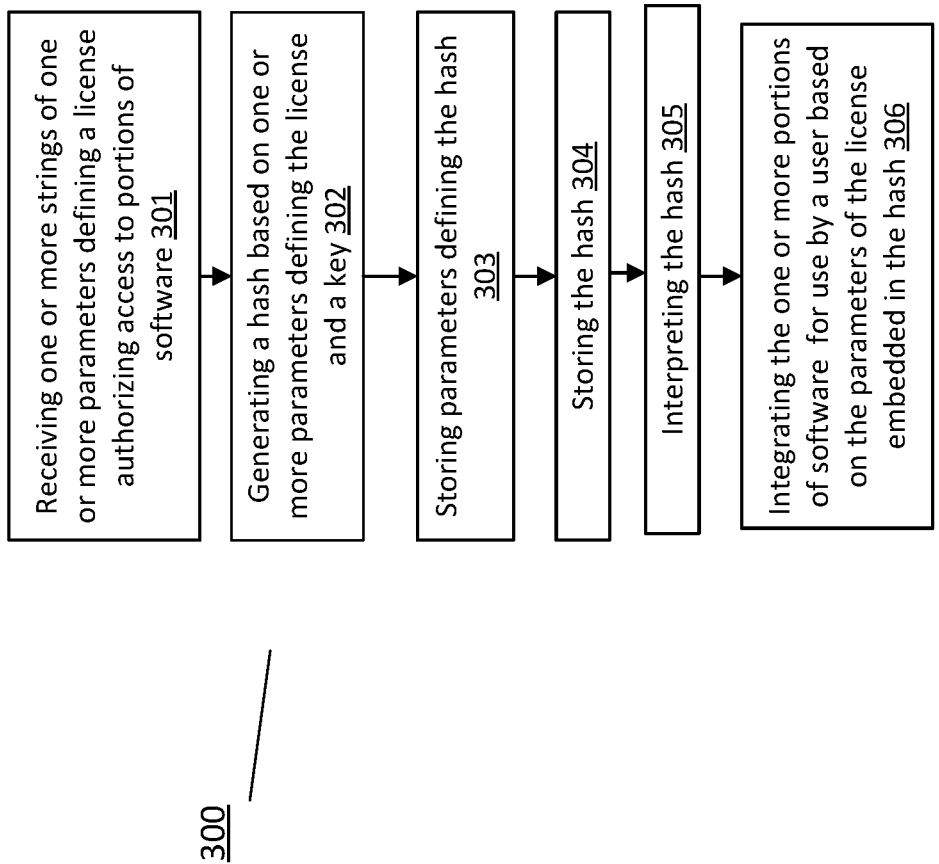
FIG. 3 is a flow chart of a method of license validation, according to some arrangements.

Referring to FIGS. 1-3, the method 300 of license validation is an example implementation of method 200. For example, block 201 corresponds to block 301. Block 202 corresponds to blocks 302, 303, and 304. Block 203 corresponds to block 305. Block 204 corresponds to block 306.

As shown in block 301, one or more strings of one or more parameters defining a license authorizing access to portions of software can be received by a processor on a user device. In some arrangements, a user can input the parameters defining the license. In alternate arrangements, receiving one or more strings of one or more parameters defining a license authorizing access to portions of software can be accomplished without a user, for example, via Optical Character Recognition ("OCR"). In this circumstance, the processor can determine the strings of the parameters defining the license.

As shown in block 302, the user device may generate a hash based on one or more parameters defining the license and a key. The hash can be generated using a cryptographic algorithm. For example, a web crypto API can be used to generate the hash. In one arrangement, the web crypto API uses cryptography to generate a hash via an API. A web crypto API can provide an API with several low-level cryptographic functions. The API can use the cryptographic functions to generate a hash. To generate the hash, parameters can be input into the cryptographic functions, which scramble the inputs and generate a hash. The hash output can be a WordArray object, which represents an array of 32-bit words. As discussed herein, the string parameters input into the cryptographic function can include the parameters listed in FIG. 4 including: a license start date 402, a license end date 403, a license status 404, a license type 405, a grace period 406, a version number 407, a module signifier 408, an upgrade number 409, and a failsafe flag 410. The parameters defining the license are not limited to the example parameters illustrated in FIG. 4. In addition to the license parameters, a key can be randomly selected from a pool of keys. The key can be used to scramble the inputs.

Hashes can be uniquely mapped to licenses. For example, in response to a user's purchase of a new license, a new hash can be generated using a cryptographic algorithm from a web crypto API that is associated with the new license. Further, multiple licenses can be incorporated in one hash. For example, in response to multiple licenses purchased from a single vendor, multiple licenses can be incorporated into a single hash.

In one arrangement, hash chaining can be implemented to incorporate multiple hashes into a single hash. In hash chaining, each hash can be mapped to a node, where each node points to another node. For example, a second node can point to the first node's position in a device's memory. A device can retrieve a node and interpret the node in response to the node's location stored in the device's memory. Thus a chain of nodes can be created such that each node in the chain points to the node next to it in the chain. Therefore, for example, knowing the location of a third node can indicate knowing the location of the second node and the first node. Thus, one hash can represent multiple hashes.

In alternate arrangements, the first hash can be used to generate a second hash. Thus in response to the interpretation of the second hash, the parameters of the license used to create the second hash, in addition to the parameters of the license used to generate the first hash, can be determined. Thus, one hash can represent multiple hashes.

Figure 11:
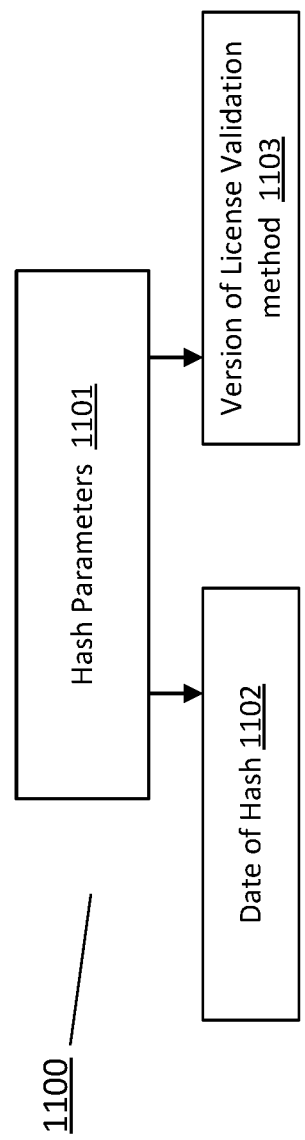
FIG. 11 is a diagram of Hash Parameters, according to some arrangements.

As shown in block 303, parameters defining the hash can be stored. As depicted in FIG. 11, hash parameter 1101 information such as the date the hash was created 1102 and the version of the license validation method that was used to generate the hash 1103, can be stored.

As shown in block 304, the hash can be stored such that the hash can be interpreted at a future time.

Figure 6:
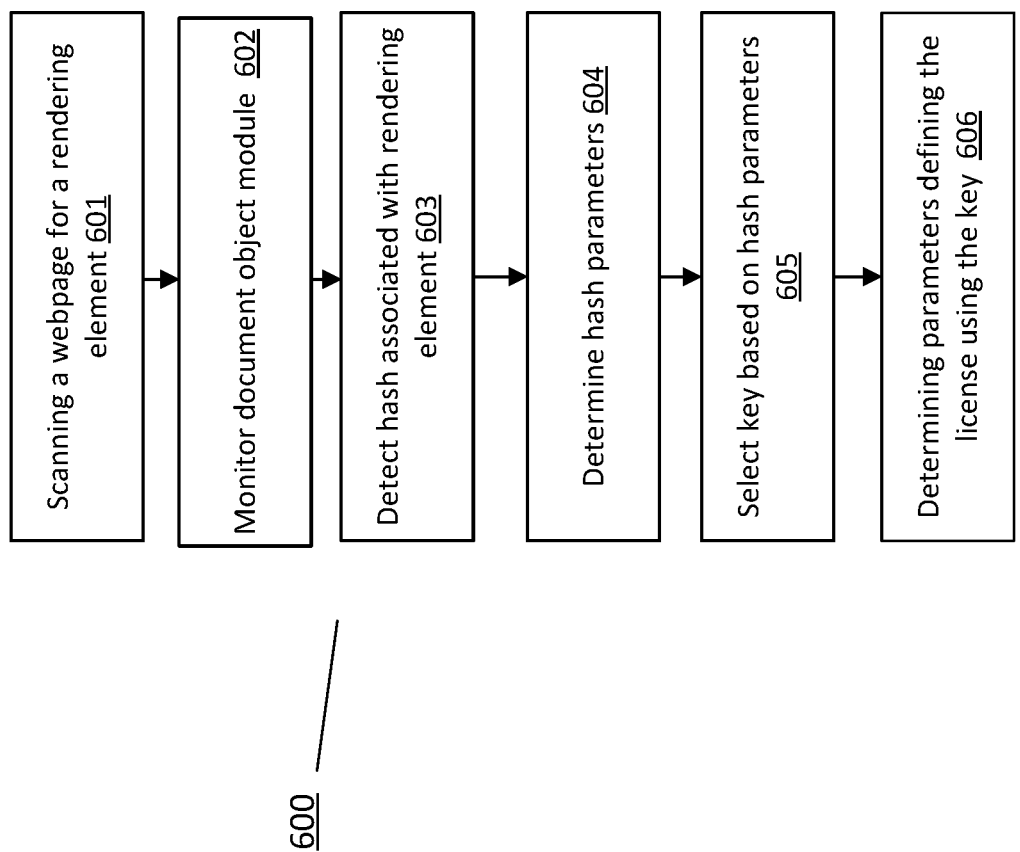
FIG. 6 is a flow chart of the method of interpreting hash, according to some arrangements.

As shown in block 305, the hash can be interpreted. Interpreting the hash is depicted in FIG. 6 discussed herein. In brief overview, FIG. 6 describes scanning a webpage for a rendering element to trigger the license validation procedure as shown in block 601, monitoring the document object module as shown in block 602, detecting the hash associated with a rendering element as shown in block 603, determining the hash parameters as shown in block 604, selecting a key based on the hash parameters as shown in block 605, and determining parameters defining the license using the key as shown in block 606.

As shown in block 306, one or more portions of software can be integrated such that a user can use the software. The software can be integrated based on the parameters of the license embedded in the hash. As depicted in FIG. 5, the one or more portions of software that can be protected by a license, and thus subsequently integrated for use by a processor includes: software functions 502, software libraries 503, and software modules 504. In other words, the one or more portions of the software can be integrated into local applications in response to a validated license.

In contrast, in response to an invalidated license, one or more local applications, or features of one or more local applications can be restricted such that the local application, or features of one or more local applications, can be prevented from running. For example, a local application may not be able to run properly in response to the local application not having access to all of the functions called in the software. Thus, the software function 502, software libraries 503, and software modules 504 may be protected by the license. The one or more local applications or features of one or more local applications that the license can protect can be software 124. In other arrangements, in response to an invalidated license, a trial mark can be overlaid across a portion of a display such that the user is aware they are attempting to access software that they are not authorized to access.

FIG. 4 is a diagram of parameters 400 defining a license, according to some arrangements. As illustrated in block 401, the parameters defining the license can include: a license start date 402, a license end date 403, a license status 404, a license type 405, a grace period 406, a version number 407, a module signifier 408, an upgrade number 409, and a failsafe flag 410. The parameters defining the license are not limited to the example parameters illustrated in FIG. 4. For example, N number of parameters can be provided to the system to generate the hash. Increasing the number of parameters used in generating the hash can increase the complexity of the hash. In some arrangements, the parameters can be provided to the system as a string of characters.

The license start date 402 can indicate the date in which the license is first activated. This is the date that a user has access to portions of the software.

The license end date 403 can indicate the date that the license is terminated. This is the date that the user does not have access to portions of the software anymore. In these instances, in response to a user's attempt to access portions of the software, the user's access can be restricted or a trial mark can be displayed. The trial mark can obscure some portion of software.

The license status 404 can indicate the current status of the license. For example, the license status can indicate that the license is active or inactive.

The license type 405 can indicate the type of license. For example, the license type 405 can indicate a machine based license, when the license is associated with a physical or virtual machine; a user based license, when the license is associated with certain users; a subscription license, when a user can pay a fee and have access to the license during the subscription term, or for as long as the user continues to pay the fee; a cloud based license, when a license can be granted based on a number of users/processors/cores that the software runs on, and so on.

The grace period 406 can indicate a length of time before the license is set to expire. In other arrangements, the grace period 406 can indicate a length of time before a license is set to renew. In some arrangements, the unit of the grace period can be defined in days. For example, the grace period can indicate that a license is set to renew in 15 days.

The version number 407 can indicate the version of the license validation method that is used to generate the hash. The method of license validation can be modified in the future. Thus, different versions of license validation can exist, and a user can be interested in knowing the version of the license validation method that was used to generate the hash. For example, the user can be interested in knowing the version of the license validation method for troubleshooting purposes.

The module signifier 408 can identify a module, a set of modules, or a portion of software that can correspond to a particular license. In some arrangements, the module signifier can be an array. The array can contain module details applicable to the license. For example, in response to a license authenticating certain hardware, that hardware can be identified as a parameter with respect to generating the hash.

The upgrade number 409 can indicate whether the software can be upgraded. In alternate arrangements, the upgrade number 409 can indicate the number of times that the software can be upgraded from a base version. For example, if the upgrade number 409 is two, then the software can be upgraded twice such that the software is updated to the latest available version of software.

The failsafe flag 410 can indicate a backup plan. For example, in response to a malfunctioning license validation method, the failsafe flag can be activated, indicating that all licenses will be deemed automatically validated. In this manner, workflow interruptions, due to not being able to access licenses, can decrease. In some arrangements, the user can determine what the failsafe flag does.

FIG. 5 is a diagram of portions of software 500 that can be protected by a license. The license authorizing access to portions of software 501 includes authorizing access to one or more software functions 502, authorizing access to one or more software libraries 503, and authorizing access to one or more software modules 504. An example of a software function 502 can be an algorithm that was designed to suit a particular purpose in a particular application. An example of a software library 503 can be a group of software functions. Access to a software library 503 can include access to various functions such that a user can use one or more software functions 502. For example, a software library 503 can include various software functions 502 such that the software library is capable of accomplishing one or more purposes.

Access to a software module 504 can include some combination of access to one or more software libraries 503 and/or access to one or more software functions 502. For example, a software module 504 can include various software functions 502 and software libraries 503 such that the software functions 502 and software libraries 503 are capable of accomplishing one or more tasks. In alternate arrangements, access to a software module 504 can be linked to certain users. For example, one or more users can be linked with certain software modules.

FIG. 6 is a flow chart of a method 600 of interpreting hash, according to some arrangements. As shown in block 601, a webpage can be scanned for rendering elements. Elements rendering on a webpage can trigger the license validation method. Triggering the license validation method in response to a rendering element on a webpage decreases the time that a user must wait for license validation to be performed. For example, if the license validation method is triggered early, in response to an element beginning to render on a webpage, then the license validation method can be completed by the time the entire webpage is finished loading. Thus, a user may not have to wait a significant period of time to interact with the webpage. Thus, a webpage that has finished loading can indicate that the licenses protecting the software have already been validated. In other words, the license validation method may not impact the timing of when a user can access the software they intended to access.

As shown in block 602, the document object module ("DOM") can be monitored. The DOM can be considered a link between webpages and the scripts that dictate the layout of the webpage. In response to a fully loaded webpage, the DOM can store the page layout in memory. In some arrangements, in response to a webpage loading with a license that prohibits access to some portion of the web page, the webpage can display a trial mark. A hacker can attempt to bypass the trial mark and access the protected software by modifying the DOM. Thus, monitoring the DOM for changes in the script can protect against hackers modifying the page layout, or DOM itself, and accessing protected portions of software. In some arrangements, MutationObserver, an API, can be implemented to monitor the DOM. Monitoring the DOM can be a means to prevent hackers from modifying the DOM.

A webpage can consist of elements that load at different rates. For example, one element of a webpage can load faster than other elements of a webpage. As shown in block 601, a web page can be scanned for rendering elements such that a rendering element triggers monitoring the DOM in block 602. Another advantage to monitoring the DOM includes minimizing the time that a hacker can modify the DOM. For example, a DOM scan in response to a completely loaded webpage can allow a hacker time during the rendering of the webpage to modify one or more elements of the webpage. By modifying the elements of the webpage, a hacker can fake enough information such that a valid license can be falsely deemed to exist. Thus, triggering monitoring of the DOM early can reduce the time that a hacker has to modify the DOM given the DOM will store the layout of the page in memory as the page loads.

As shown in block 603, a hash associated with a rendering element on a webpage can be detected. For example, a hash can be associated with an element on a webpage such that the element can not render without validating the license. In other words, an element on a webpage can be prohibited from rendering in response to a hash preventing the user's processor from interpreting the rendering element. Thus, a hash can be associated, and detected, via elements on a webpage.

As shown in block 604, the hash parameters can be determined. Referring to FIG. 11, the hash parameters 1101 can include the date of the hash 1102 and the version of the license validation method 1103. FIG. 11 will be discussed further herein.

Based on the determined hash parameters, a key can be selected from a pool of keys as shown in block 605. During the generation of the hash in tier one of the method, for example, in block 302 referred to in FIG. 3, a key can be used to create the hash. During tier two of the method, license decryption, the same key can be determined based on the parameters of the hash. The same key used to generate the hash can be used to decrypt the hash.

As shown in block 606, the hash can be decrypted. The decryption can occur using the key determined by the hash parameters. Decrypting the hash allows the user device access to the parameters defining the license.

Figure 7:
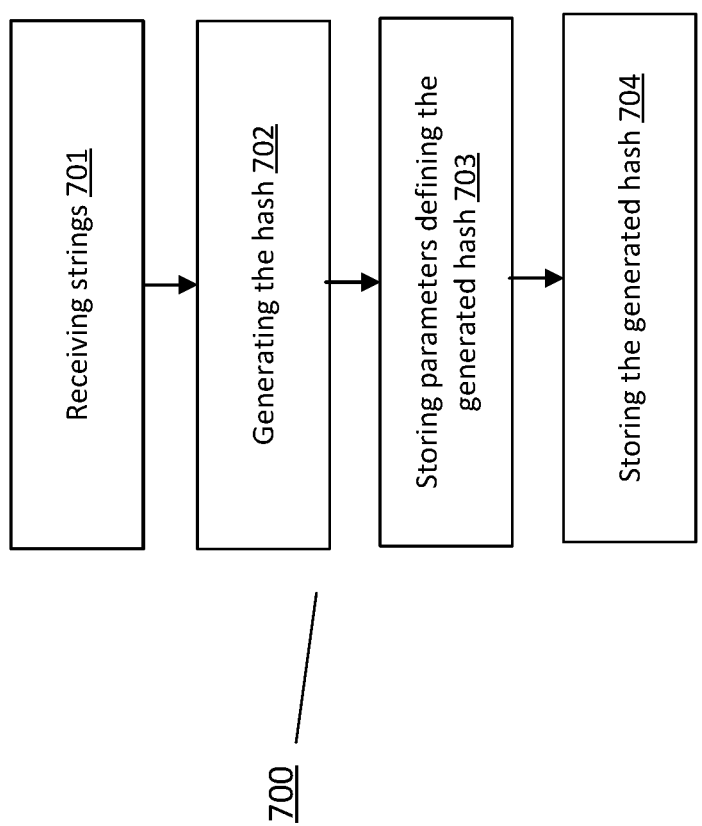
FIG. 7 is a flow chart of a method of encryption in a first time period, according to some arrangements.
Figure 8:
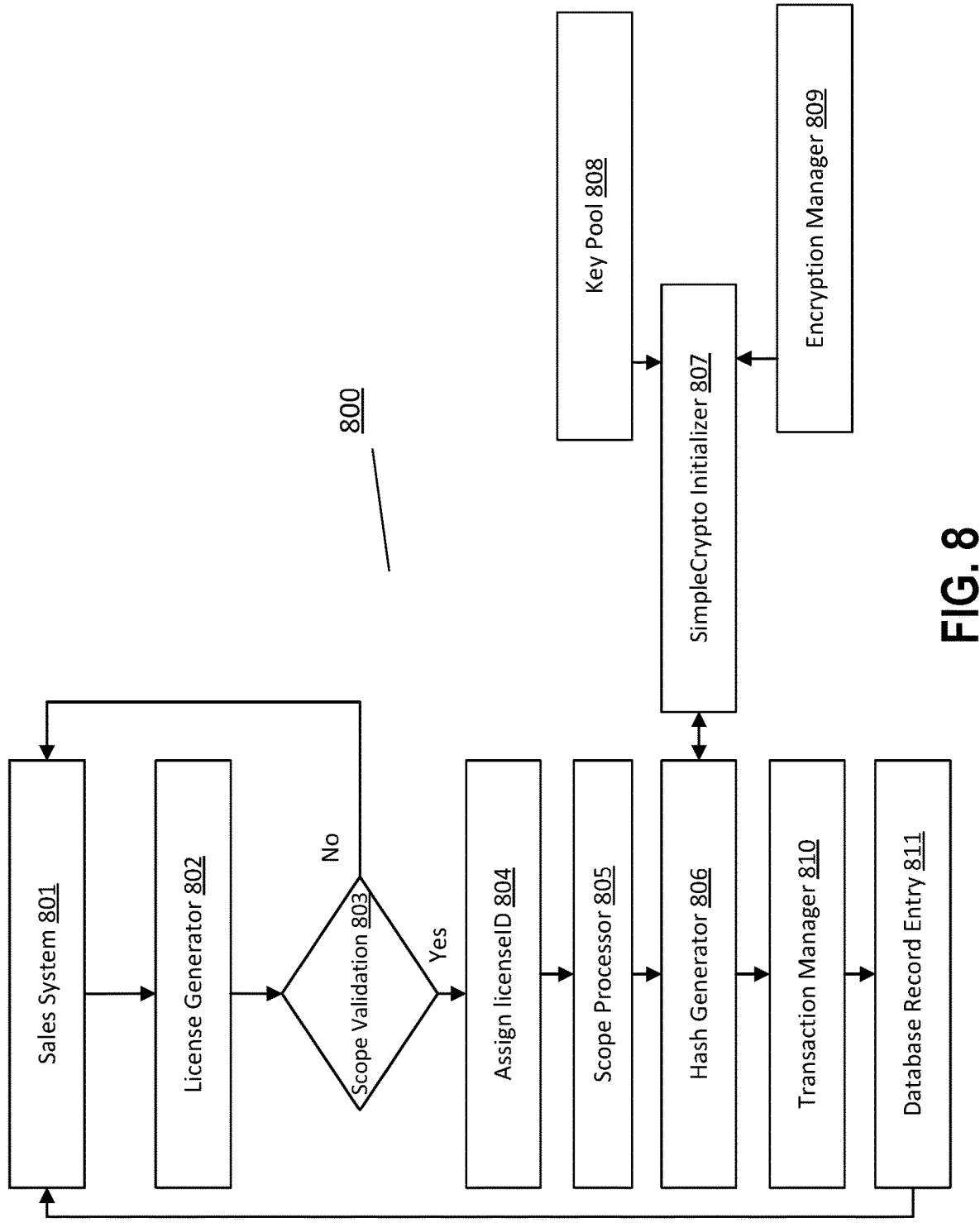
FIG. 8 is a flow of a method of encryption in a first time period, according to some arrangements.

FIG. 7 is a flow chart of a method 700 of encryption in a first time period, according to some arrangements. As described herein, the encryption utility can be considered the first tier of the method.

As shown in block 701, strings of parameters defining a license are received by a processor on a user device.

As shown in block 702, a hash can be generated. The hash can be generated based on the one or more parameters defining the license, as described herein, and a key.

The hash can be generated using cryptography. To generate the hash, parameters are input into a function, which scrambles the inputs and generates a hash. For example, a web crypto API can be used. A web crypto API can provide an API with several low-level cryptographic functions. The API can use these cryptographic functions to generate a hash. Further, the key can be randomly selected from a pool of keys.

Multiple licenses can be incorporated in one hash. For example, in response to a purchase of multiple licenses from a single vendor, a single hash can be created that corresponds to multiple licenses. In one arrangement, hash chaining can be implemented to incorporate multiple hashes into a single hash. In hash chaining, each hash can be mapped to a node, where each node points to another node. A device can retrieve a node and interpret the node in response to the node's location stored in the device's memory. Thus a chain of nodes can be created such that each node in the chain points to the node next to it in the chain. Therefore, knowing the location of the last node means knowing the location of all prior nodes. Thus, one hash can represent multiple hashes.

In alternate arrangements, a first hash can be used to generate a second hash. Thus in response to the interpretation of the second hash, the parameters of the license used to create the second hash, in addition to the parameters of the license used to generate the first hash, can be determined. As shown in block 703, parameters defining the hash can be stored. Referring to FIG. 11, examples of hash parameters 1101 can include the date the hash was created 1102 and the version of the license validation method that was used to generate the hash 1103. Additionally, as shown in block 704, the hash can be stored such that the hash can be interpreted at a future time.

Referring to FIGS. 1-8, the method 800 of encryption in a first time period is an example implementation of method 700. For example, block 701 corresponds to blocks 801, 802, 803, 804, and 805. Block 702 corresponds to block 806, 807, 808, and 809. Block 703 corresponds to block 810. Block 704 corresponds to 811.

A sale system 801 can provide the license scope, in the form of license parameters in a string, to a license generator 802. Referring to FIG. 4, such parameters defining the license scope 401 can include: a license start date 402, a license end date 403, a license status 404, a license type 405, a grace period 406, a version number 407, a module signifier 408, an upgrade number 409, and a failsafe flag 410. The sale system 801 can include an entity. For example, the sale system 801 entity can include an individual entity, a for-profit entity, or a non-profit entity. The entity can be developing web applications and interested in securing those applications such that only licensed users can access the applications.

A license generator 802 can be a function or memory structure that receives N discrete parameters and generates a singular continuous container, or license, that is comprised of the N discrete parameters. The license generator 802 can receive the N discrete parameters to generate the hash. In one arrangement, the license generator can map the parameters to a license. For example, the license generator 802 can generate a WordArray object.

The decision in block 803 confirms that the license created from the license generator 802 comprises the correct license parameters. In other words, the decision block 803 confirms the integrity of the WordArray object containing the N parameters to generate the hash, generated by the license generator 802. In response to the license generator 802 receiving and/or storing license parameters that differ from the license parameters that sale system 801 provided the license generator 802, an error can have occurred and the sale system 801 can provide the license generator 802 with new license parameters.

In response to the license generator 802 receiving and/or storing license parameters that are the same as the license parameters that sale system 801 provided the license generator 802, a licenseID 804 is assigned to a license based on the license parameters. In other words, a particular set of license parameters can be mapped to a particular licenseID. Thus, for each unique set of license parameters, a unique licenseID and subsequent hash can be generated. The present solution can operate on the newly generated hash and validate the license. In this manner, the present solution is scalable and adaptable.

As shown in block 805, the scope processor can store the licenseID.

The hash generator 806 can send the scope parameters to the SimpleCrypto Initializer 807. The SimpleCrypto Initializer 807 can randomly select a key from the key pool 808. Further, the SimpleCrypto Initializer 807 can be given permission, from the encryption manager 809, to generate a hash. The SimpleCrypto Initializer 807 can deliver a generated hash back to the hash generator 806.

In block 810, a transaction manager receives the generated hash and can store parameters defining the hash. The parameters defining the hash are depicted in FIG. 11. For example, parameters defining the hash 1101 can include information such as: the date the hash was created 1102, the version of the license validation method that was used to generate the hash 1103. The hash and hash parameters can be stored and recorded in a database 811. In response to the database successfully storing a hash associated with a specific licenseID 804, the sale system 801 can be notified of the successful storage of the hash.

Figure 9:
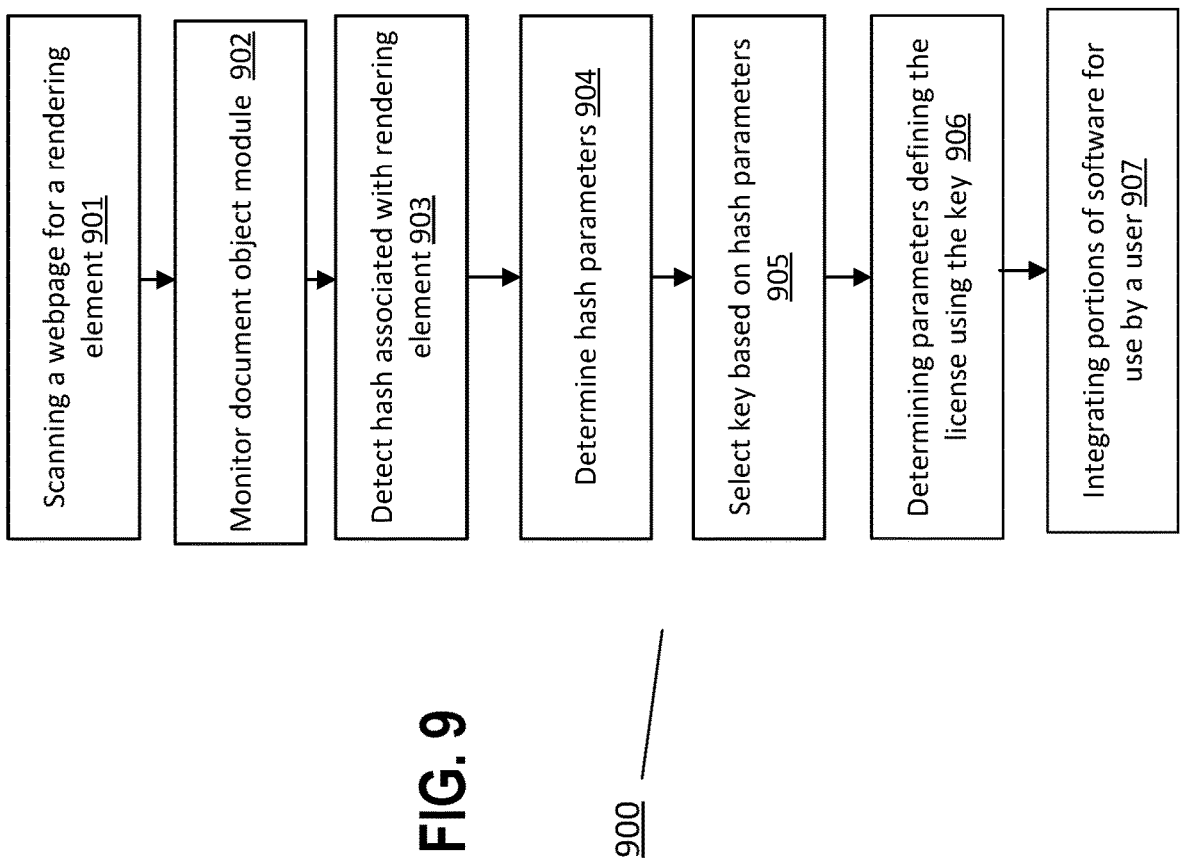
FIG. 9 is a flow chart of a method of license decryption in a second time period, according to some arrangements.

FIG. 9 is a flow chart of license decryption 900 in a second time period, according to some arrangements. As described herein, license decryption, or reading the license, can be considered the second tier of the license validation method.

As shown in block 901, a webpage can be scanned for rendering elements. Elements rendering on a webpage can trigger the second tier of the license validation method. As shown in block 902, the DOM can be monitored. Monitoring the DOM for changes in the script can protect against hackers modifying the page layout, or DOM itself, and accessing protected portions of software. As shown in block 903, a hash associated with a rendering element on a webpage can be detected. For example, a hash can be associated with an element on a webpage such that the element can not render without validating the license. In other words, an element on a webpage can be prohibited from rendering in response to a hash preventing the user's processor from interpreting the rendering element. Thus, a hash can be associated, and detected, via elements on a webpage. As shown in block 904, the hash parameters can be determined. Referring to FIG. 11, examples of hash parameters 1101 can include the date the hash was created 1102 and the version of the license validation method that was used to generate the hash 1103.

As shown in block 905, based on the determined hash parameters, a key can be selected from a pool of keys. During the generation of the hash in tier one of the method, for example, in block 302 referred to in FIG. 3, a key can be used to create the hash. During tier two of the method, license decryption, the same key can be determined based on the parameters of the hash. As shown in block 906, the hash can be decrypted and parameters defining the license can become known. The decryption can occur using the key determined by the hash parameters. In block 907, portions of the software can be integrated by for use by a user. The hash protects one or more portions of software form being used without authorization. Once authorization occurs, the one or more portions of software can be integrated such that the software can be accessible and the elements on the webpage can be rendered and/or interacted with.

Figure 10:
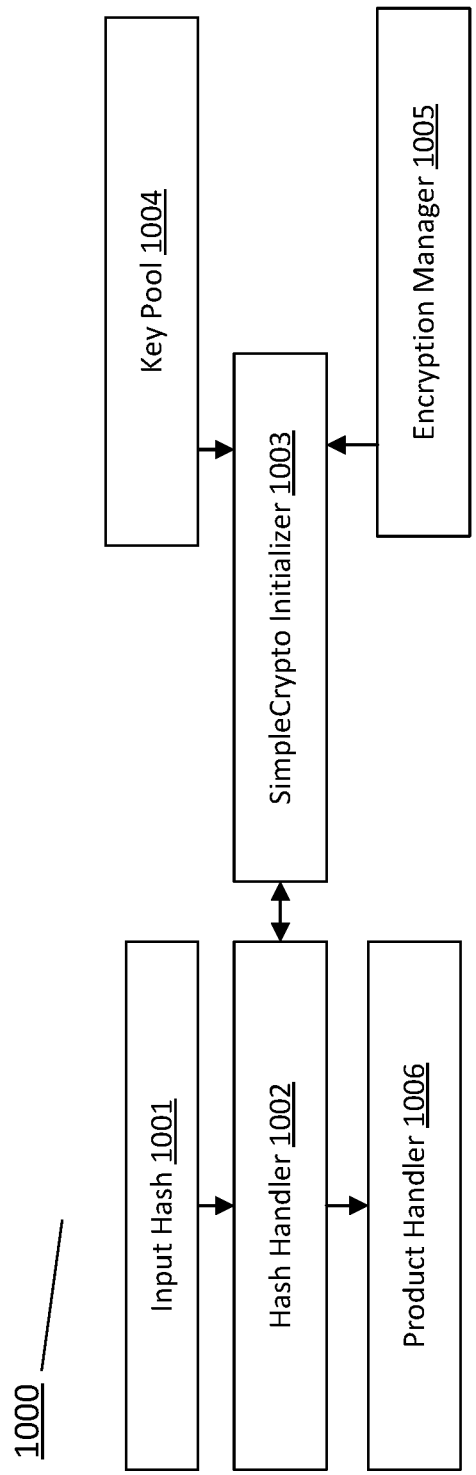
FIG. 10 is a flow chart of a method of a decryption utility, according to some arrangements.

FIG. 10 is a flow chart of a method 1000 of a decryption utility according to some arrangements. Detected hash can be used as an input 1001 to a hash handler 1002. The hash handler 1002 can send the hash to a SimpleCrypto Initializer 1003. The SimpleCrypto Initializer 1003 can retrieve a key from a key pool 1004. The key can be retrieved from the key pool based on hash parameters. Referring to FIG. 11, examples of the hash parameters 1101 include the date the hash was created 1102 and the version of the license validation method that was used to generate the hash 1103. The Decryption Manager 1005 can send the SimpleCrypto Initializer 1003 a scope generator request. The scope generator request can grant permission for the Simple Crypto Initializer 1003 to decrypt the hash. The SimpleCrypto Initializer 1003 can decrypt the hash and determine the N parameters of the license. Referring to FIG. 4, the parameters defining the license 401 can include a license start date 402, a license end date 403, a license status 404, a license type 405, a grace period 406, a version number 407, a module signifier 408, an upgrade number 409, and a failsafe flag 410. The SimpleCrypto Initializer 1003 can send the parameters defining the license back to the hash handler 1002. The hash handler 1002 can send the parameters defining the license to the product handler 1006. Depending on the parameters defining the license, the product handler 1006 can integrate the software such that the software is accessible to a user. For example, the user can access the software in response to a validated license, the license validated based on the parameters defining the license. Referring to FIG. 5, the software authorized by the license can include authorizing access to software functions 502, authorizing access to software libraries 503, and authorizing access to software modules 504.

FIG. 11 is a diagram of Hash Parameters 1100, according to some arrangements. The hash parameters 1101 can include the date of the hash 1102 and the version of the license validation method 1103. The date of the hash 1102 can reveal the date that the hash was created. The version of the license validation method 1103 can reveal the version of the license validation method that generated the hash.

As discussed herein, modifications to the license validation method can be incorporated. Inputting the version number of the license validation method as an input to the hash generator keeps the license validation method scalable. The hash parameters are not limited to the example parameters illustrated in FIG. 11.

While various arrangements of the present solution have been described above, it should be understood that they have been presented by way of example only, and not by way of limitation. Likewise, the various diagrams can depict an example architectural or configuration, which are provided to enable persons of ordinary skill in the art to understand example features and functions of the present solution. Such persons would understand, however, that the solution is not restricted to the illustrated example architectures or configurations, but can be implemented using a variety of alternative architectures and configurations. Additionally, as would be understood by persons of ordinary skill in the art, one or more features of one arrangement can be combined with one or more features of another arrangement described herein. Thus, the breadth and scope of the present disclosure should not be limited by any of the above-described illustrative arrangements.

It is also understood that any reference to an element herein using a designation such as "first," "second," and so forth does not generally limit the quantity or order of those elements. Rather, these designations can be used herein as a convenient means of distinguishing between two or more elements or instances of an element. Thus, a reference to first and second elements does not mean that only two elements can be employed, or that the first element must precede the second element in some manner.

Additionally, a person having ordinary skill in the art would understand that information and signals can be represented using any of a variety of different technologies and techniques. For example, data, instructions, commands, information, signals, bits and symbols, for example, which can be referenced in the above description can be represented by voltages, currents, electromagnetic waves, magnetic fields or particles, optical fields or particles, or any combination thereof.

A person of ordinary skill in the art would further appreciate that any of the various illustrative logical blocks, modules, processors, means, circuits, methods and functions described in connection with the aspects disclosed herein can be implemented by electronic hardware (e.g., a digital implementation, an analog implementation, or a combination of the two), firmware, various forms of program or design code incorporating instructions (which can be referred to herein, for convenience, as "software" or a "software module), or any combination of these techniques. To clearly illustrate this interchangeability of hardware, firmware and software, various illustrative components, blocks, modules, circuits, and steps have been described above generally in terms of their functionality. Whether such functionality is implemented as hardware, firmware or software, or a combination of these techniques, depends upon the particular application and design constraints imposed on the overall system. Skilled artisans can implement the described functionality in various ways for each particular application, but such implementation decisions do not cause a departure from the scope of the present disclosure.

Furthermore, a person of ordinary skill in the art would understand that various illustrative logical blocks, modules, devices, components and circuits described herein can be implemented within or performed by an integrated circuit (IC) that can include a general purpose processor, a digital signal processor (DSP), an application specific integrated circuit (ASIC), a field programmable gate array (FPGA) or other programmable logic device, or any combination thereof. The logical blocks, modules, and circuits can further include antennas and/or transceivers to communicate with various components within the network or within the device. A general purpose processor can be a microprocessor, but in the alternative, the processor can be any conventional processor, controller, or state machine. A processor can also be implemented as a combination of computing devices, e.g., a combination of a DSP and a microprocessor, a plurality of microprocessors, one or more microprocessors in conjunction with a DSP core, or any other suitable configuration to perform the functions described herein.

If implemented in software, the functions can be stored as one or more instructions or code on a computer-readable medium. Thus, the steps of a method or algorithm disclosed herein can be implemented as software stored on a computer-readable medium. Computer-readable media includes both computer storage media and communication media including any medium that can be enabled to transfer a computer program or code from one place to another. A storage media can be any available media that can be accessed by a computer. By way of example, and not limitation, such computer-readable media can include RAM, ROM, EEPROM, CD-ROM or other optical disk storage, magnetic disk storage or other magnetic storage devices, or any other medium that can be used to store desired program code in the form of instructions or data structures and that can be accessed by a computer.

In this document, the term "module" as used herein, refers to software, firmware, hardware, and any combination of these elements for performing the associated functions described herein. Additionally, for purpose of discussion, the various modules are described as discrete modules; however, as would be apparent to one of ordinary skill in the art, two or more modules can be combined to form a single module that performs the associated functions according arrangements of the present solution.

Additionally, memory or other storage, as well as communication components, can be employed in arrangements of the present solution. It will be appreciated that, for clarity purposes, the above description has described arrangements of the present solution with reference to different functional units and processors. However, it will be apparent that any suitable distribution of functionality between different functional units, processing logic elements or domains can be used without detracting from the present solution. For example, functionality illustrated to be performed by separate processing logic elements, or controllers, can be performed by the same processing logic element, or controller. Hence, references to specific functional units are only references to a suitable means for providing the described functionality, rather than indicative of a strict logical or physical structure or organization.

Various modifications to the implementations described in this disclosure will be readily apparent to those skilled in the art, and the general principles defined herein can be applied to other implementations without departing from the scope of this disclosure. Thus, the disclosure is not intended to be limited to the implementations shown herein, but is to be accorded the widest scope consistent with the novel features and principles disclosed herein, as recited in the claims below.

What is claimed is:

1. A method for license validation comprising: receiving, by a processor on a user device, one or more strings of one or more parameters defining a license authorizing access to at least one or more portions of software; generating, by the processor, a first hash based on the one or more parameters defining the license and a key; storing, by the processor, information defining the generated first hash in a memory; storing, by the processor, the generated first hash in the memory; responsive to an element rendering on a web page, determining, by the processor, a version of an application program interface used to generate the first hash and the key used to generate the first hash, by interpreting the first hash; and integrating, by the processor, the one or more portions of software for use by a user, the one or more portions of software integrated based on the one or more parameters defining the license embedded in the first hash.

2. The method of claim 1, wherein the license authorizing access to at least one or more portions of software comprises at least one of one or more software functions, one or more software libraries, and one or more software modules.

3. The method of claim 1, wherein the license validation is implemented via an application program interface on a user device.

4. The method of claim 3, wherein the application program interface implements a web crypto application program interface.

5. The method of claim 4, wherein an output of the web crypto application interface is a WordArray object.

6. The method of claim 1, wherein the one or more parameters defining the license comprise at least one of:
   a start license date;
   an end license date;
   a license status;
   a license type;
   a grace period;
   a version number;
   a module signifier;
   an upgrade number; and
   a failsafe flag.

7. The method of claim 1, wherein the information defining the generated first hash comprises at least one of:
   a date of the first hash generation; and
   a version number of an application program interface that generated the first hash.

8. The method of claim 1, further comprising generating one or more hashes based on the generated first hash.

9. The method of claim 1, further comprising using a second generated hash to point to the first generated hash, the second hash generated based on a second set of one or more parameters defining a license and a second key, by chaining hashes.

10. The method of claim 1, wherein interpreting the first hash further comprises:
   scanning, triggered by the rendering of the element on the web page;
   monitoring, by the processor, a document object module;
   detecting, by the processor, based on the scanned rendered element, the first hash;
   determining, by the processor, based on the first hash, the information defining the first hash;
   selecting, by the processor, based on the information defining the first hash, the key; and determining, by the processor, using the key and scanned rendered element from the document object module, the one or more parameters defining the license embedded in the first hash.

11. The method of claim 1, further comprising determining, by the processor, to restrict at least one of one or more local applications and one or more features of one or more applications.

12. The method of claim 11, further comprising determining, by the processor, to overlay a trial mark to the user, the trial mark obscuring at least some portion of the one or more local applications.

13. The method of claim 1, further comprising a first time period and a second time period, wherein the license authorizing access to at least one or more portions of software is encrypted during the first time period, wherein license decryption is completed during the second time period, the second time period occurring a time after the first time period.

14. The method of claim 13, wherein the encryption of the license further comprises: receiving the one or more strings; generating the first hash; storing the information defining the generated first hash in the memory; and storing the generated first hash in the memory.

15. The method of claim 13, wherein the decryption further comprises:
   scanning, triggered by the rendering of the element on the web page;
   monitoring, by the processor, a document object module;
   detecting, by the processor, based on the scanned rendered element, the first hash;
   determining, by the processor, based on the first hash, the information defining the first hash;
   selecting, by the processor, based on the information defining the first hash, the key;
   determining, by the processor, using the key and scanned rendered element from the document object module, the one or more parameters defining the license embedded in the first hash; and
   integrating the one or more portions of software for use by a user.

16. The method of claim 1, wherein the one or more strings of the one or more parameters defining a license authorizing access to at least one or more portions of software can be received by a user input.

17. The method of claim 1, wherein the one or more strings of the one or more parameters defining a license authorizing access to at least one or more portions of software can be received by a non-user input.

18. The method of claim 1, wherein the generated first hash is uniquely mapped to the one or more parameters defining the license.

19. A computer program product comprising a non-transitory computer-readable program medium code stored thereupon, the code, when executed by a processor, causing the processor to: receive one or more strings of one or more parameters defining a license authorizing access to at least one or more portions of software; generate a first hash based on the one or more parameters defining the license and a key; store information defining the generated first hash in a memory; store the generated first hash in the memory; responsive to an element rendering on a web page, determine a version of an application program interface used to generate the first hash and the key used to generate the first hash, by interpreting the first hash; and integrate the one or more portions of software for use by a user, the one or more portions of software integrated based on the one or more parameters defining the license embedded in the first hash.

20. A system, comprising: a memory; and a processor, the processor is configured to: receive one or more strings of one or more parameters defining a license authorizing access to at least one or more portions of software; generate a first hash based on the one or more parameters defining the license and a key; store information defining the generated first hash in the memory; store the generated first hash in the memory; responsive to an element rendering on a web page, determine a version of an application program interface used to generate the first hash and the key used to generate the first hash, by interpreting the first hash; and integrate the one or more portions of software for use by a user, the one or more portions of software integrated based on the one or more parameters defining the license embedded in the first hash.

\* \* \* \* \*